(12) United States Patent
Konuma et al.

(10) Patent No.: US 6,628,263 B1
(45) Date of Patent: *Sep. 30, 2003

(54) INFORMATION INPUT/OUTPUT APPARATUS

(75) Inventors: Toshimitsu Konuma, Kanagawa (JP); Takeshi Nishi, Kanagawa (JP); Shunpei Yamazaki, Tokyo (JP)

(73) Assignee: Semiconductor Energy Laboratory Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/916,260

(22) Filed: Aug. 22, 1997

Related U.S. Application Data

(63) Continuation of application No. 08/400,098, filed on Mar. 3, 1995, now abandoned.

(30) Foreign Application Priority Data

Mar. 4, 1994 (JP) .............................. 6-060147

(51) Int. Cl.⁷ ................................................ G09G 3/36
(52) U.S. Cl. ...................... 345/104; 345/102; 345/179; 349/5
(58) Field of Search ............................ 345/32, 87, 88, 345/92, 104, 157, 173–175, 187, 207, 102, 156, 179; 382/324, 321; 349/5, 6, 11, 12, 2

(56) References Cited

U.S. PATENT DOCUMENTS

| 3,885,096 | A | | 5/1975 | Inuiya |
| 4,544,946 | A | * | 10/1985 | VanBreemen |
| 4,862,149 | A | * | 8/1989 | Boyer ........................ 340/635 |
| 4,873,398 | A | | 10/1989 | Hubby, Jr. |
| 4,890,096 | A | * | 12/1989 | Taguchi et al. ............. 345/174 |
| 4,893,903 | A | * | 1/1990 | Thakar et al. ................. 349/1 |
| 4,916,308 | A | * | 4/1990 | Meadows .................... 345/175 |
| 5,005,950 | A | * | 4/1991 | Morin .......................... 345/87 |
| 5,099,343 | A | * | 3/1992 | Margerum et al. ............ 349/63 |
| 5,162,782 | A | * | 11/1992 | Yoshioka .................... 345/104 |
| 5,162,783 | A | * | 11/1992 | Moreno ...................... 345/175 |
| 5,181,030 | A | * | 1/1993 | Itaya et al. .................. 345/174 |
| 5,235,363 | A | * | 8/1993 | Vogeley et al. ............. 345/187 |
| 5,250,931 | A | | 10/1993 | Misawa et al. |
| 5,272,553 | A | * | 12/1993 | Yamamoto et al. ............ 349/8 |
| 5,298,892 | A | * | 3/1994 | Shapiro et al. ................ 345/88 |
| 5,341,155 | A | * | 8/1994 | Elrod et al. ................. 345/179 |
| 5,400,050 | A | * | 3/1995 | Matsumoto et al. ........ 345/100 |
| 5,402,151 | A | * | 3/1995 | Duwaer ...................... 345/173 |
| 5,416,610 | A | * | 5/1995 | Kikinis ....................... 345/207 |
| 5,422,693 | A | | 6/1995 | Vogeley et al. |
| 5,430,462 | A | * | 7/1995 | Katagiri et al. ............. 345/104 |
| 5,436,635 | A | * | 7/1995 | Takahara et al. .............. 345/92 |

(List continued on next page.)

FOREIGN PATENT DOCUMENTS

| EP | 0 349 322 | 1/1990 |
| EP | 0 515 015 A2 | 11/1992 |
| EP | 0 629 941 | 12/1994 |
| JP | 49-029844 | 3/1974 |
| JP | 49-132932 | 12/1974 |

(List continued on next page.)

*Primary Examiner*—Kent Chang
(74) *Attorney, Agent, or Firm*—Eric J. Robinson; Robinson Intellectual Property Law Office, P.C.

(57) ABSTRACT

An information input/output apparatus comprising a display device, a screen on which an image displayed on the display device is projected with magnification, and a position detecting means for detecting a position of an arbitrarily designated particular point on the screen.

58 Claims, 9 Drawing Sheets

U.S. PATENT DOCUMENTS

| | | | | | |
|---|---|---|---|---|---|
| 5,448,263 A | * | 9/1995 | Martin | ........................ | 345/173 |
| 5,457,572 A | * | 10/1995 | Ishii et al. | | |
| 5,476,906 A | * | 12/1995 | Yokoo et al. | | |
| 5,502,459 A | * | 3/1996 | Marshall et al. | ............. | 345/157 |
| 5,504,501 A | * | 4/1996 | Hauck et al. | ................ | 345/157 |
| 5,512,917 A | * | 4/1996 | Scott | ........................... | 345/109 |
| 5,515,079 A | * | 5/1996 | Hauck et al. | ................ | 345/157 |
| 5,537,233 A | * | 7/1996 | Miura et al. | ................... | 349/61 |
| 5,585,817 A | * | 12/1996 | Itoh et al. | .................... | 345/104 |
| 5,602,679 A | * | 2/1997 | Dolgoff et al. | ............... | 345/32 |
| 5,771,039 A | * | 6/1998 | Ditzik | ........................ | 345/178 |
| 5,811,328 A | * | 9/1998 | Zhang et al. | | |
| 5,852,487 A | * | 12/1998 | Fujimori et al. | ............ | 349/162 |
| 5,929,834 A | * | 7/1999 | Inoue et al. | ................. | 345/104 |

FOREIGN PATENT DOCUMENTS

| | | |
|---|---|---|
| JP | 60-230228 | 11/1985 |
| JP | 61-101827 | 5/1986 |
| JP | 01-187625 | 7/1989 |
| JP | 02-036485 | 2/1990 |
| JP | 02-053131 | 2/1990 |
| JP | 02-170193 | 6/1990 |
| JP | 03-15935 | 1/1991 |
| JP | 05-224636 | 9/1993 |

* cited by examiner

INFORMATION INPUT/OUTPUT APPARATUS

This application is a Continuation of Ser. No. 08/400,098, filed Mar. 3, 1995, now abandoned.

BACKGROUND OF THE INVENTION

The present invention relates to an information input/output apparatus using a projection type liquid crystal electro-optical device. The invention also relates to an information input/output apparatus that can input a position on a display surface which position is indicated by contact to the display surface, light emission, or some other means. Further, the invention relates to an information input/output apparatus that reads image information such as a drawing placed on a display surface, or displays readout image information.

There are conventionally known apparatuses which allow an information signal to be externally inputted with respect to information displayed on the display surface of a display device such as a CRT or a liquid crystal electro-optical device while causing an operator to feel as if he were writing characters on a sheet with a writing tool, and which display an image corresponding to the input information signal on the display surface.

To allow input of an information signal to the display device, the display surface is equipped with a position detecting means for detecting a position on the display surface. When a certain external force such as pressure, magnetic force, light, etc. is applied to a certain point on the display surface, the position detecting means detects such a point and supplies a corresponding information signal to the display device. The display device alters an image being displayed.

Examples of the position detecting means are a touch panel using a transparent resistive film or a transparent electrode matrix, and an infrared sensor.

Recently, an apparatus using a liquid crystal electro-optical device as the image information display means is commonly used as the above type of information input/output apparatus.

With the above configuration, an operator can perform an input operation while feeling as if he were directly operating the display contents of the display device. If input information is displayed, on a realtime basis, on the same coordinate system of the display device, the operator can input characters or an image while feeling as if he were writing those on a sheet with a writing tool.

However, there have occurred various problems in implementing the conventional configuration using the liquid crystal electro-optical device.

For example, when pressure is exerted on the display surface of the liquid crystal electro-optical device, the orientation of a liquid crystal material incorporated in the liquid crystal electro-optical device may be disordered, disabling a correct display.

Further, magnetism, static electricity, etc. to indicate a position on the display surface may vary display contents, or destroy elements formed on the liquid crystal electro-optical device, to make it incapable of display from that time on. Most of information input schemes are such that an operator moves a pen or a finger while touching the display surface therewith. In those schemes, such information as a document or an image cannot be inputted as a whole.

The above problems could be solved by a configuration in which the liquid crystal electro-optical device is not affected at all by an external force exerted on the display surface.

A projection type liquid crystal electro-optical device (liquid crystal projector) is known as a liquid crystal electro-optical device capable of having such a configuration.

The projection type liquid crystal electro-optical device is compact, light in weight and free of adjustments while being capable of large-screen display with a diagonal dimension of more than 40 inches. Further, it is not affected by the geomagnetism unlike the case of a large-sized CRT. Having such advantages, the projection type liquid crystal electro-optical device is expected to become a display device that will replace a large-screen CRT.

The basic configuration of the projection type liquid crystal display device is such that light is inputted to a transmission or reflection type liquid crystal electro-optical device and resulting transmission or reflection light is expanded by an optical system, to thereby project and display an image on a screen (display surface).

The projection type liquid crystal electro-optical device is classified into the front type in which light is projected onto the display side (front side) of the screen and reflection light is viewed as an image, and the rear type in which light is projected onto the side (rear side) of the screen opposite to the display side and transmission light, i.e., scattered light is viewed as an image.

However, although the projection type liquid crystal electro-optical device is capable of large-screen display, there is no apparatus which causes an information signal indicating a position on the screen (display surface) arbitrarily designated through the display surface to be sent to the display device, and alters its display contents accordingly.

Therefore, although the projection type liquid crystal electro-optical device can display images of a movie or a TV program, it has not been used in a field in which a large-sized screen is required to facilitate operations in connection with CAD or workstation.

SUMMARY OF THE INVENTION

An object of the present invention is to provide an information input/output apparatus which allows an operator to input information of a position on the screen of a projection type liquid crystal electro-optical device by designating the position with a pen, a finger, or the like, and which can alter display contents of the liquid crystal electro-optical device accordingly.

Another object of the invention is to provide an information input/output apparatus which can alter display contents of a display device that displays an image on a large-sized screen viewable by a number of persons in accordance with information directly inputted with respect to the display surface.

To attain the above objects, the invention employs the following constitution. That is, according to the invention, an information input/output apparatus comprises:

a display device (an electro-optical device);

a screen on which an image displayed on the display device (electro-optical device) is projected with magnification; and position detecting means for detecting a position of an arbitrarily designated particular point on the screen.

Further, according to the invention, an information input/output apparatus comprises:

a liquid crystal electro-optical device;

a screen on whose rear surface an image displayed on the liquid crystal electro-optical device is projected with magnification; and an image pickup device provided on a rear side of the screen, for receiving light entering the screen from its front side to its rear side.

Furthermore, according to the invention, an information input/output apparatus comprises:

a liquid crystal electro-optical device;

a screen on whose rear surface an image displayed on the liquid crystal electro-optical device is projected with magnification; and an image pickup device provided on a rear side of the screen, for reading an image existing on a front side of the screen.

Still further, according to the invention, an information input/output apparatus comprises:

a liquid crystal electro-optical device;

a screen on whose rear surface an image displayed on the liquid crystal electro-optical device is projected with magnification;

an image pickup device provided on a rear side of the screen, for reading an image existing on a front side of the screen; and position detecting means provided on the front side of the screen, for detecting a position of an arbitrarily designated particular point on the screen.

DESCRIPTION OF THE PREFERRED EMBODIMENTS

According to the present invention, there is provided an information input/output apparatus having an information input/output interface means that is composed of a screen on which an image is displayed and a means for detecting the position of an arbitrarily designated particular point on the screen.

Figure 1:
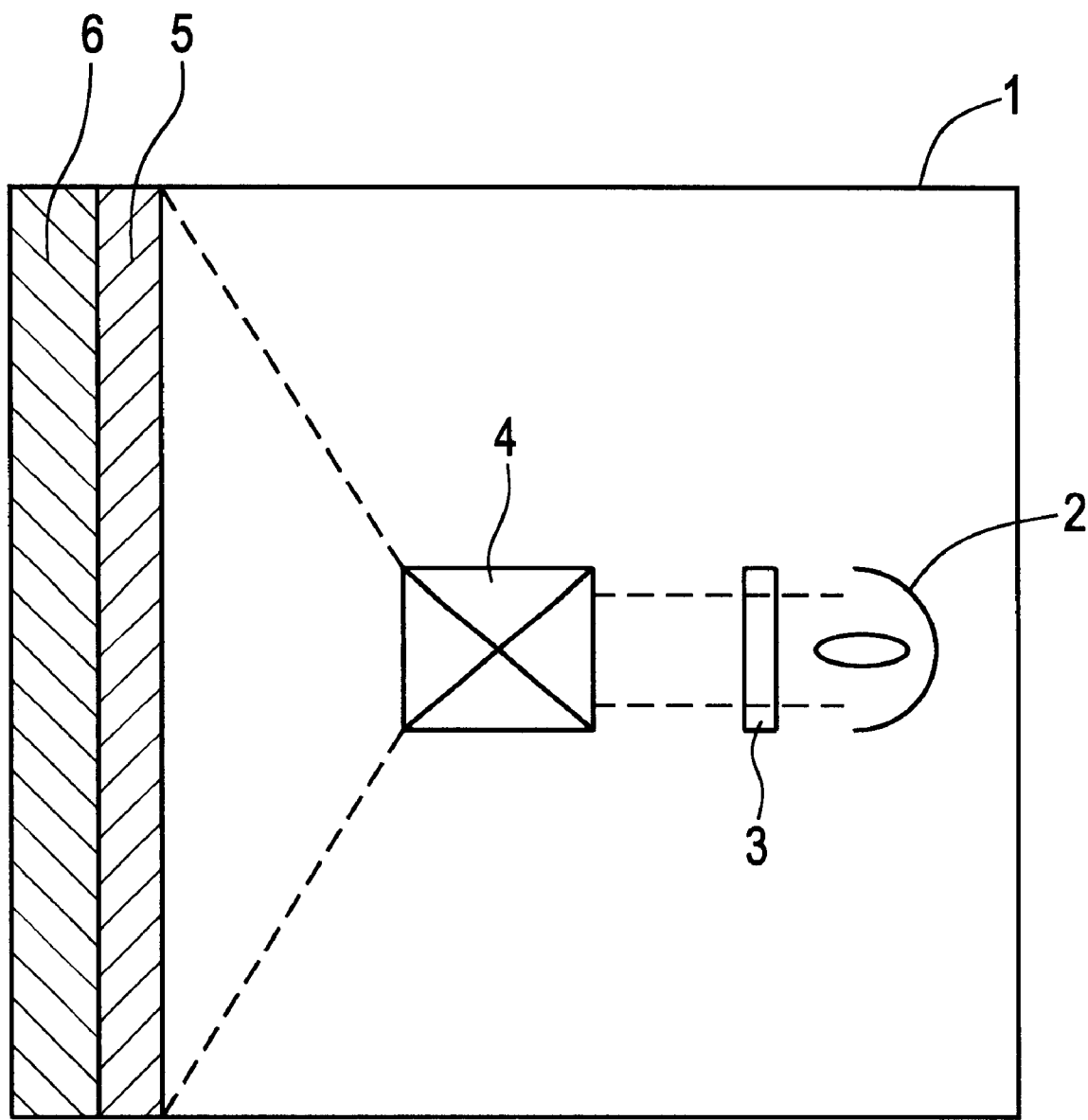
FIG. 1 shows the concept of an information input/output apparatus according to the present invention.

FIG. 1 shows the concept of an information input/output apparatus according to the invention. In FIG. 1, reference numeral 1 denotes a main body of the information input/output apparatus; 2, a light source; 3, a liquid crystal electro-optical device; 4, an optical system; 5, a screen; and 6, a position detecting means. A specific configuration will be described below.

In FIG. 1, the optical system is of a rear type. Although a xenon lamp, a halogen lamp, a metal halide lamp, etc. can be used as the light source 2, the metal halide lamp is desirable because it satisfies such conditions as high brightness, high luminous efficiency, well-balanced distribution of RGB color components, and a long life.

Light emitted from the light source 2 passes through a condensing optical system (not shown), and is inputted to the liquid crystal electro-optical device 3. Light transmitted from the liquid crystal electro-optical device 3 is magnified by the optical system 4, and projected onto the screen 5. Thus, an image displayed on the liquid crystal electro-optical device 3 is projected, with magnification, onto the screen 5.

TN type, STN type, scattering type, and other operation modes may be used in the liquid crystal electro-optical device 3. Examples of liquid crystal materials that can be used in the liquid crystal electro-optical device 3 are a nematic liquid crystal, a smectic liquid crystal, a ferroelectric liquid crystal, and a PDLC (polymer dispersion type liquid crystal) in which the above liquid crystals are contained in a polymeric resin.

Although both of a simple matrix type driving scheme and an active matrix type driving scheme can be used, the active matrix type driving scheme in which switching elements, particularly crystalline thin-film transistors, are formed on a substrate for the respective pixels is desirable because it can operate at high speed and provide a high-quality image.

In particular, the active matrix type liquid crystal electro-optical device using the crystalline thin-film transistors is preferable, because it can be implemented as what is called a monolithic structure in which switching thin-film transistors that are connected to the respective pixels and a driving peripheral circuit for driving the liquid crystal electro-optical device are formed on a single substrate, providing such advantages as a reduced device size and a reduced price.

Although in FIG. 1 the light emitted from the light source 2 is inputted to the rear side of the liquid crystal electro-optical device 3 and is transmitted therefrom, the liquid crystal electro-optical device 3 may be of a reflection type in which case the light is inputted to its display surface side and the reflection light is projected onto the screen 5 via the optical system 4.

To perform color display, color filters of three colors (RGB) are provided for the respective pixels on one of two substrates that constitute the liquid crystal electro-optical device 3. Alternatively, the following scheme may be employed. Three liquid crystal electro-optical devices are used. The light emitted from the light source 2 is once separated into three color components by dichroic mirrors, for instance. (The dichroic mirror reflects only one of the three color components (RGB). The respective color components are inputted to the different liquid crystal electro-optical devices, and the light beams transmitted from the liquid crystal electro-optical devices are combined by the dichroic mirrors and then projected onto the screen.

In the case of separating the light emitted from the light source 2, the following display scheme may be employed. There are used three transmission type ferroelectric liquid crystal electro-optical devices whose entire display surface is composed of a single pixel and which has a high-speed shutter function. And one ferroelectric liquid crystal electro-optical device is provided to perform only the image display. Switching between the three color components is performed within one frame by the shutter function.

The display device may be a device that emits light by itself, such as a CRT.

Figure 8A:
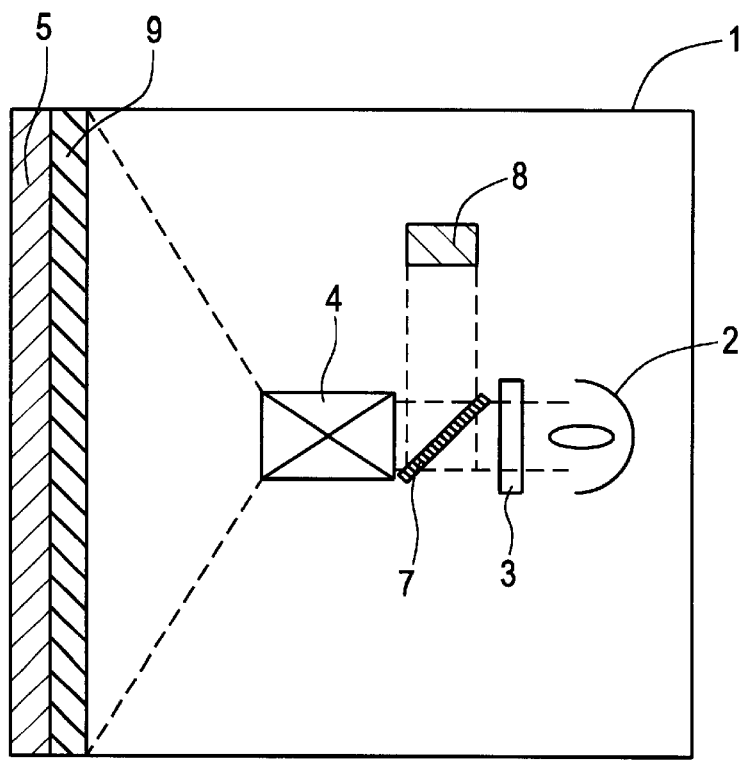
FIGS. 8A, 8B and 8C show the concept of another information input/output apparatus according to the present invention.
Figure 8B:
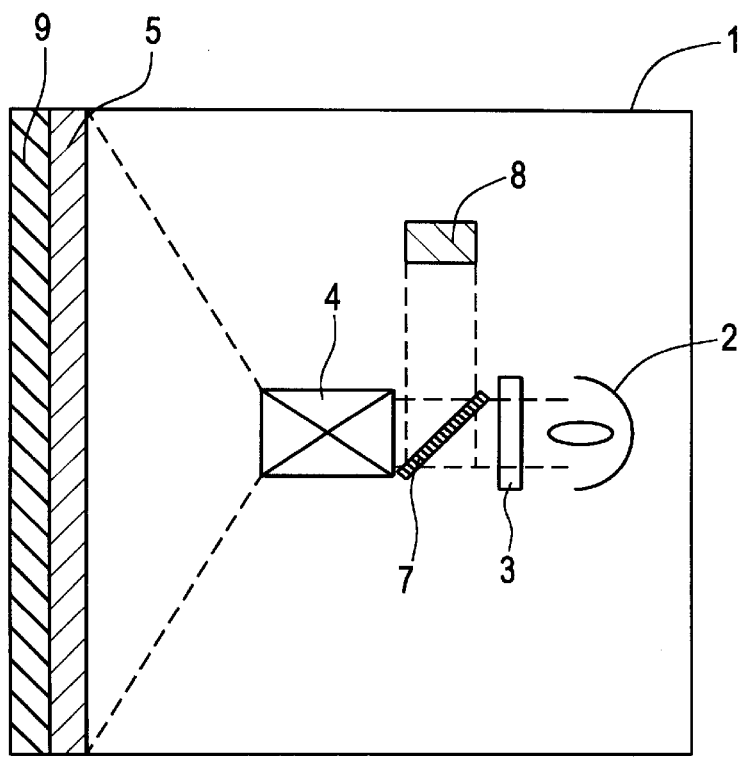
Figure 8C:
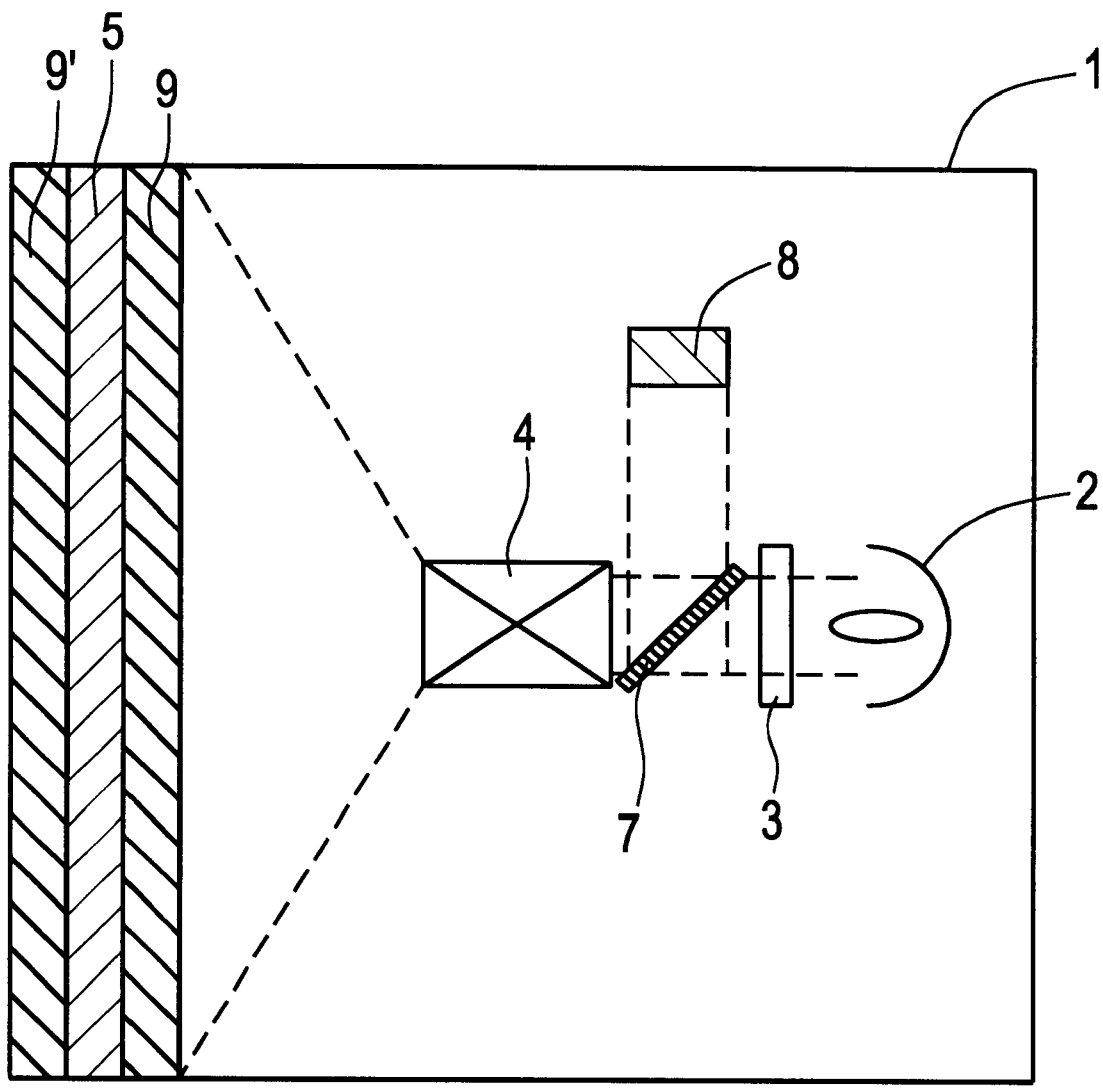

A description will be made of the screen 5. A 3.0-mm-thick substrate that transmits and scatters light is used as the basic component of the screen 5. Although the substrate may be made of glass, plastics, etc., a plastic substrate is desired to provide a lighter apparatus. To improve the brightness of images, for example, a combination of a Fresnel lens 9 and a lenticular lens 9' may be used, as shown, for example, in FIGS. 8A, 8B and 8C. Where it is expected that the contrast is reduced by external light, a polarizing sheet may be bonded to the substrate.

When the light coming from the liquid crystal electro-optical device 3 is diffracted on the screen 5 to blur outlines of the respective pixels, a black matrix may be formed in a grid-like manner on the front or rear side of the screen 5 so as not to reduce the opening ratio of the display surface to a great extent.

In FIG. 1, a position detecting means 6 is provided on the screen 5. FIGS. 5(A)–5(D) show typical configurations of the position detecting means 6.

Figure 5A:
FIGS. 5(A)–5(D) show typical configurations of position detecting means.

In FIG. 5(A), elastic transparent substrates each having a plurality of band-like transparent electrodes made of, for instance, ITO (indium tin oxide) on its surface are laid one on another through a spacer so that the electrodes cross each other at right angles. When pressure is applied to a particular point from the substrate, opposed band-like electrodes contact with each other at that point and electrical conduction is established there. The position of the conducting point is detected by scanning the opposed band-like transparent electrodes by sequentially applying voltages thereto.

Figure 5B:
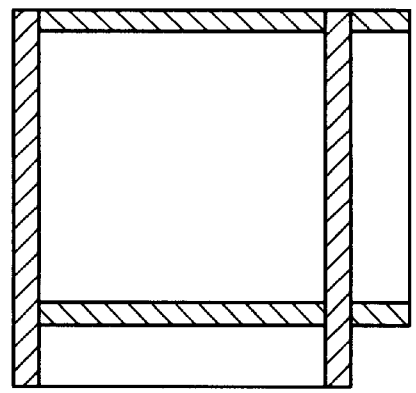

In FIG. 5(B), a transparent electrode is formed over almost the entire inner surface of each elastic transparent substrate, and the two substrates are opposed to each other through a spacer in which terminals for the transparent electrode are provided on both horizontal ends of one substrate and on both vertical ends of the other substrate.

As in the case of the position detecting means of FIG. 5(A), when pressure is applied to a particular point from the substrate surface, the opposed electrodes contact with each other to establish a conductive state at that point. The position of the conducting point can be detected by measuring a resistance between the two terminals of each substrate.

The substrates serving as the position detecting means in FIGS. 5(A) and 5(B) may be made of polyethylene terephthalate, for instance. One of the two substrates may be made of a glass or plastic plate.

Figure 5C:
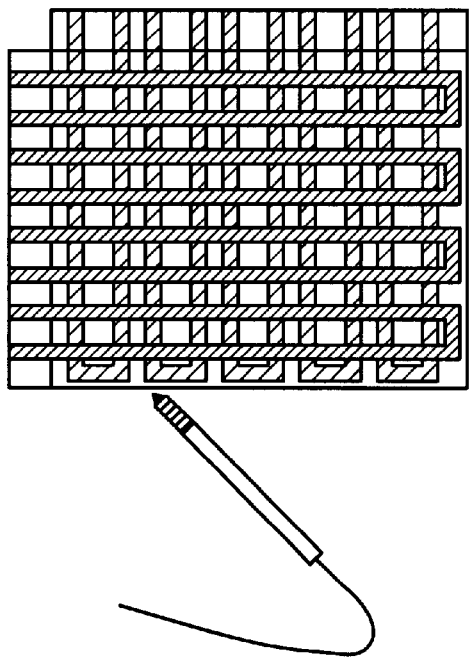

In FIG. 5(C), an electric field is applied to an input pen in which a coil is wound around a tip portion of a pen made of glass, plastics, or the like. Information on an input position can be generated by electromagnetic induction between the input pen and a transparent electrode provided on a transparent substrate which induction is caused by a magnetic field generated by the input pen.

The position detecting means of FIGS. 5(A) and 5(B) are provided on the surface on the front (viewing) side of the screen. If the material of the screen is flexible, they may be provided on the rear surface. The position detecting means of FIG. 5(C) may be provided on either the front or rear surface of the screen as long as it enables detection of an input position.

Figure 5D:
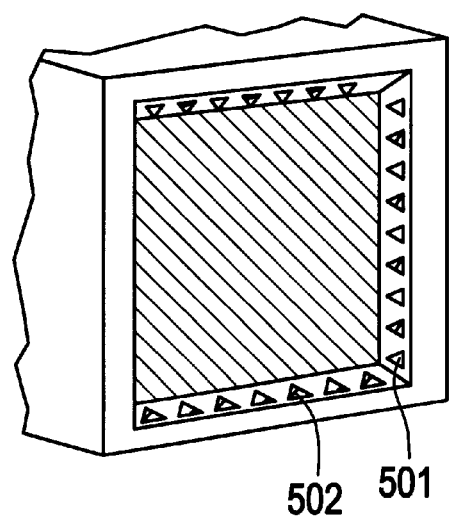

FIG. 5(D) shows another position detecting means, in which infrared light generating sources and infrared sensors are provided on the two sides of a screen in each of the horizontal and vertical directions so as to be opposed to each other. A position where an infrared ray emitted from an infrared ray generating source is blocked by a certain object can be detected as an input position. Input to the display surface can be effected by a finger, etc.

In any of the above configurations, information on an input position on the screen detected by the position detecting means is supplied to the driving device of the liquid crystal electro-optical device and a computer or the like connected thereto. And an image corresponding to that information is displayed on the screen.

To obtain correct correspondence between a position on the screen 5 detected by the position detecting means and an image displayed by means of the liquid crystal electro-optical device 3, a method is required which can form an image of the liquid crystal electro-optical device 3 on the position detecting means of the screen 5 without causing a deviation. For example, this is done in the following manner. Positioning pixels are formed on the display surface of the liquid crystal electro-optical device 3 in addition to the display pixels. Positioning markers are similarly formed on the corresponding positions on the screen. Before an image is actually displayed, the inclination angle of the liquid crystal electro-optical device 3, the focal point of lenses of the optical system 4, and other factors are adjusted so that light beams passing through the positioning pixels reach the markers on the screen 5. Alternatively, the positioning may be performed using particular pixels or the display portion (for example, pixels at the center and four corners of the display portion) of the liquid crystal electro-optical device 3.

Figure 2:
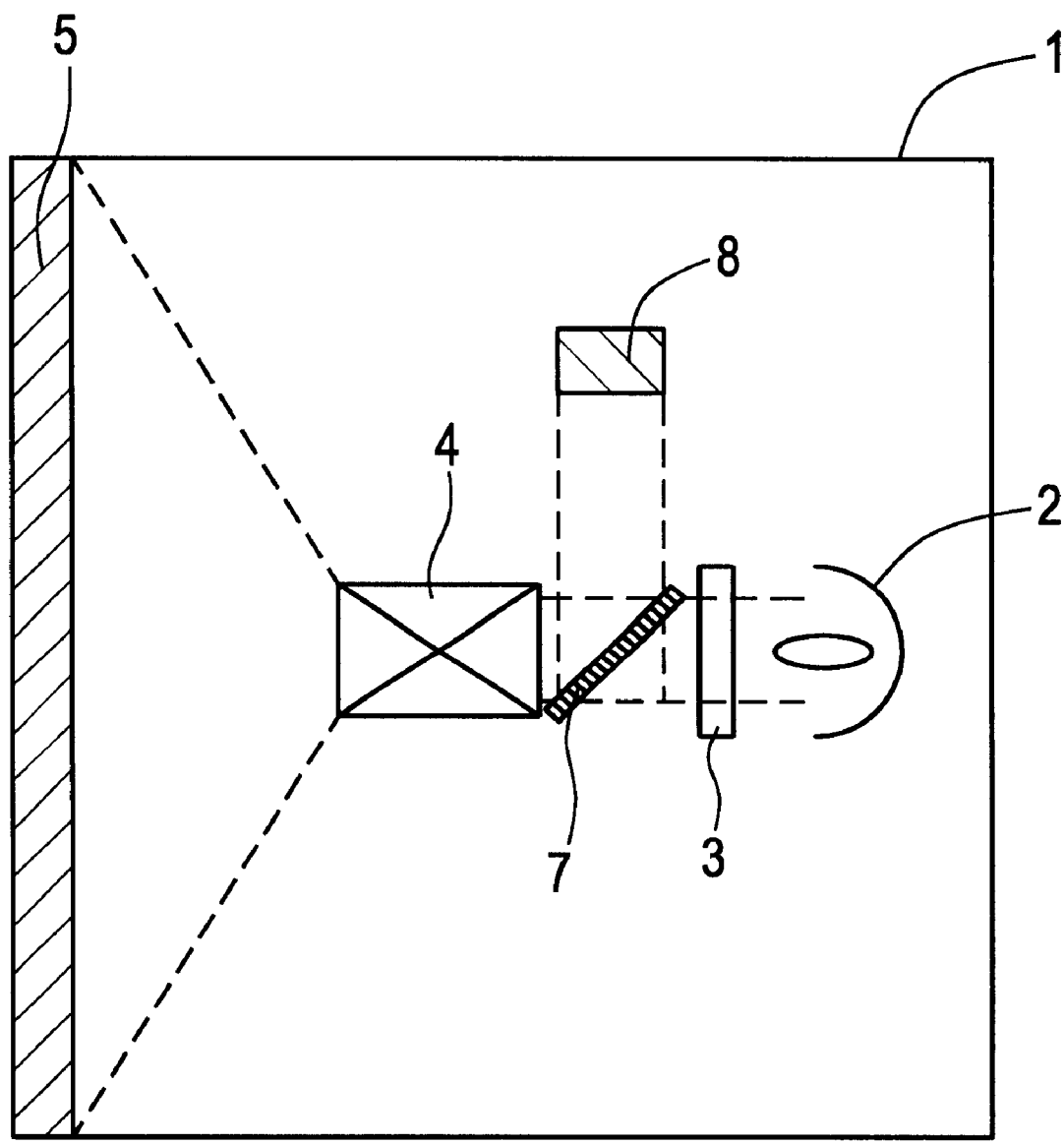
FIG. 2 shows the concept of another information input/output apparatus according to the invention.

FIG. 2 shows the concept of another information input/output apparatus according to the invention.

In FIG. 2, an image pickup device 8 as the position detecting means is provided in the main body 1. Light emitted from a light-emitting pen, or the like is inputted from the front side to the rear side of the screen 5, and the input position is detected by the image pickup device 8. This configuration can accommodate a large screen simply by adjusting the optical system 4; that is, it is not necessary to change the size of the light receiving surface of the image pickup device 8 itself.

Therefore, the apparatus of FIG. 2 can accommodate a large-sized screen much more easily than apparatuses having a position detecting means that uses a substrate equivalent in size to the screen, such as the position detecting means shown in FIGS. 5(A)–5(C). Further, the resolution of the apparatus can be improved easily by making the image pickup device 8 itself of a type having a high resolution. Further, where the color of light emitted from the illumination device such as a light-emitting pen is varied, the difference in the color of emitted light (i.e., difference in wavelength) can be detected by incorporating a color filter in the image pickup device 8.

Therefore, the apparatus of FIG. 2 can be used such that an image is displayed on a large-sized display surface (screen) that can be viewed by a number of persons and another image corresponding to information that is directly inputted through the display surface with a light-emitting pen or the like is also displayed thereon. That is, the apparatus can be used as an electronic blackboard that can replace the conventional blackboard or white board. It goes without saying that computation, character recognition, etc. may be performed using a computer or the like based on input information.

The image pickup device 8 may be made of a charge-coupled device (CCD) or a photoconductive device.

In FIG. 2, a half mirror 7 is disposed between the optical system 4 and the liquid crystal electro-optical device 3, and the light that is inputted from the front side to the rear side of the screen 5 is passed through the optical system 4, and inputted to and read by the image pickup device 8. To read the light that is inputted from the front side to the rear side of the screen 5 and enters the image pickup device 8, it is apparently possible to use an optical system that is different from the optical system 4.

The apparatus may be so adapted as to control, i.e., switch the state of the screen 5 from a light scattering state to a highly transparent state, to thereby read, as an image, a document or object existing on the front side of the screen 5. A light to illuminate a document to read it may be provided inside the main body 1. That is, the image pickup device 8 is used like an image sensor.

It is also possible to store information of a readout image, and later display it on the screen 5.

The apparatus can be used such that an image having an enormous amount of information is input/output instantly.

To realize switching control between the transparent state and the scattering state, the screen 5 may be constructed such that a liquid crystal material is held between a pair of transparent substrates having respective electrodes and a device is incorporated whose state can be switched between the transparent state and the scattering state by an electric field applied between the electrodes. In this case, switching is made to the scattering state to display an image on the screen 5, and to the transparent state to read an image provided externally. A ferroelectric liquid crystal electro-optical device or a polymer dispersion type liquid crystal electro-optical device may be used.

Embodiments of the invention will be hereinafter described.

Embodiment 1

FIG. 1 shows a configuration of an information input/output apparatus according to a first embodiment of the invention. Light emitted from a halogen lamp 2 is inputted to a liquid crystal electro-optical device 3 which is provided inside a main body 1 and displaying an image. The light transmitted from the liquid crystal electro-optical device 3 is projected, with magnification, onto a screen 5 via an optical system 4. The screen 5 is equipped with a position detecting device 6. When an input pen (not shown) is brought into contact with the screen 5, an input signal corresponding to the coordinates on the screen 5 is supplied to a driving circuit of the liquid crystal electro-optical device 3, and a signal corresponding to the input signal is supplied from the driving circuit to the device 3.

Figure 6:
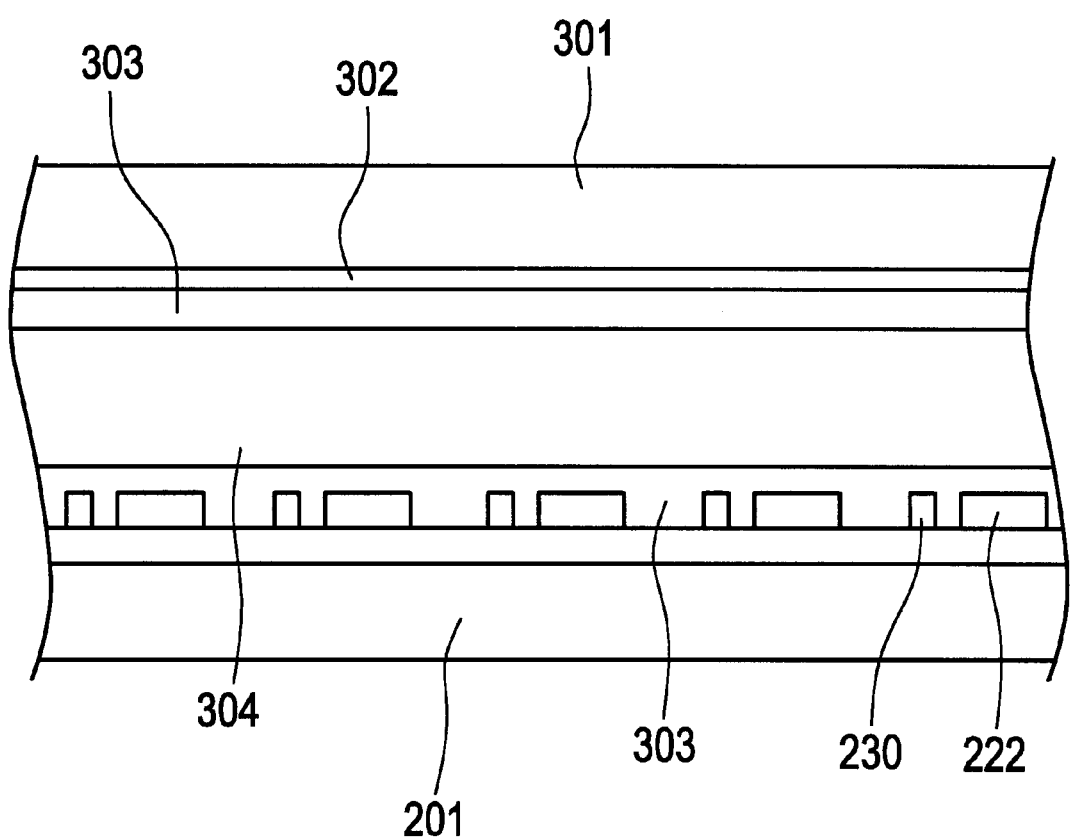
FIG. 6 shows the concept of a liquid crystal electro-optical device that was manufactured according to an embodiment of the invention.

FIG. 6 shows the concept of a liquid crystal electro-optical device that was manufactured according to this embodiment. The liquid crystal electro-optical device is of an active matrix driving type in which switching elements of crystalline thin-film transistors (TFTs) are formed for the respective pixels. A monolithic structure is employed in which a peripheral driving circuit for driving the liquid crystal electro-optical device is formed on the same substrate.

FIGS. 3(A)–3(F) and 4(A)–4(C) show manufacturing steps of the thin-film transistors. FIGS. 3(A)–3(F) are sectional views taken along chain lines in FIGS. 4(A)–4(C). First, a silicon dioxide film of 1,000–3,000 Å, for instance 2,000 Å, in thickness was formed as an undercoat oxide film 202 on a substrate 201 (Corning 7059; diagonal length: 1.6 in.) by sputtering in an oxygen atmosphere. However, to improve the mass productivity, a film may be formed by decomposing and depositing TEOS by plasma CVD.

Then, an amorphous silicon film of 300–5,000 Å, preferably 500–1,000 Å, in thickness was deposited by plasma CVD or LPCVD, and crystallized by being left in a reducing hatmosphere of 550° C. to 600° C. for 24 hours. This step may be replaced by laser beam illumination. Island-like active layer regions 203 and 204 were formed by patterning the silicon film thus crystallized. A silicon oxide film 205 of 700–1,500 Å in thickness was formed thereon by sputtering.

Then, an aluminum film (containing Si of 1 wt % or Sc of 0.1–0.3 wt %) of 1,000 Å to 3 μm, for instance 6,000 Å, in thickness was formed by electron beam evaporation or sputtering. A photoresist (for instance, OFPR 800/30cp produced by Tokyo Ohka Kogyo Co., Ltd.) was then formed by spin coating. If an aluminum oxide film of 100–1,000 Å in thickness was formed over the entire surface of the aluminum film by anodic oxidation before the photoresist was formed, good adhesion was obtained between the aluminum film and the photoresist. Further, the formation of the aluminum oxide film was effective in forming porous anodic oxide films only on the side faces in a later anodic oxidation step, because the aluminum oxide film suppressed a leak current from the photoresist. Subsequently, the photoresist was patterned and the aluminum film was etched, to form wiring line portions 206 and 209 and gate electrode portions 207, 208 and 210 (see FIG. 3(A)).

Figure 4A:
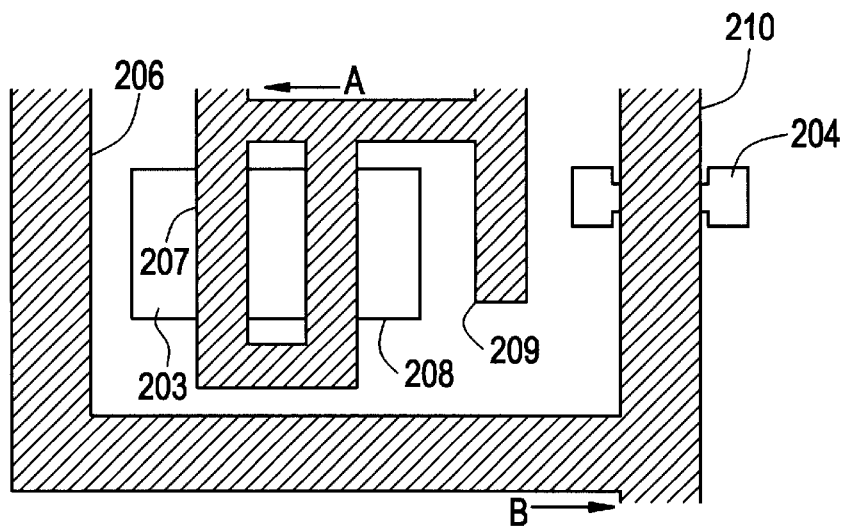
Figure 4B:
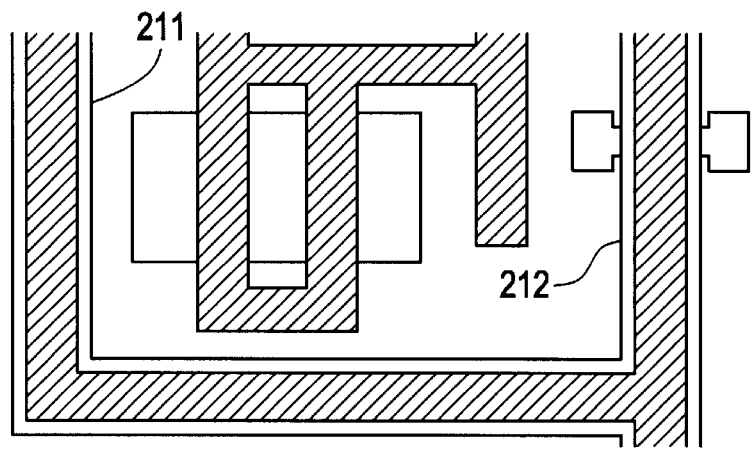

The photoresist portions left on the wiring lines and the gate electrodes serve as an anodic oxidation preventing mask in a later anodic oxidation step. FIG. 4(A) is a top view of the structure in this state. The gate electrodes 207 and 208 and the wiring line 209 are electrically independent of the wiring line 206 and the gate electrode 210 (see FIG. 4(A)). The former portions are called group A and the latter portions are called group B.

Among the above wiring lines and gate electrodes, the wiring line and gate electrode of group B were subjected to anodic oxidation by causing a current flow through those portions in an electrolyte, so that anodic oxide films 211 and 212 of 3,000 Å to 25 μm, for instance 0.5 μm, in thickness were formed on the side faces of the wiring line and the gate electrode. The anodic oxidation was performed in an acid aqueous solution of citric acid of 3–20%, oxalic acid, phosphoric acid, chromic acid, sulfuric acid, or the like by applying a constant voltage of 5–30 V, for instance 8 V, to the gate electrode. The anodic oxide films thus formed were porous. In this embodiment, the anodic oxidation was performed for 20–240 minutes in an oxalic acid solution of 30° C. to 80° C. with a voltage of 8 V. The thickness of the anodic oxide films was controlled by the anodic oxidation time and temperature. Since no current flows through the portions of group A, i.e., the gate electrodes 207 and 208 and the wiring line 209, no anodic oxide film was formed on those portions (see FIGS. 3(B) and 4(B)).

Then, the mask was removed, and a current was caused to flow through the gate electrodes and the wiring lines in an electrolyte. At this time, a current was caused to flow through the gate electrodes and the wiring lines of both of groups A and B in an ethylene glycol solution of PH≈7 containing tartaric acid of 3–10%, boric acid and nitric acid. Better oxide films were obtained when the temperature of the solution was lower than the room temperature, i.e., at about 10° C. As a result, barrier-type anodic oxide films 213–217 were formed on the top and side faces of the gate electrodes and wiring lines 206–210. The thickness of the anodic oxide films 213–217 were proportional to the applied voltage. For example, 1,200-Å-thick anodic oxide films were formed when the applied voltage was 100 V. In this embodiment, since the voltage was increased to 100 V, produced anodic oxide films had a thickness of 1,200 Å. The thickness of the barrier-type anodic oxide films can be selected arbitrarily. However, if they are too thin, there is a possibility that aluminum is eluted when the porous anodic oxide films are etched in a later step. Preferable results were obtained when the barrier-type anodic oxide films were thicker than 500 Å.

Figure 3A:
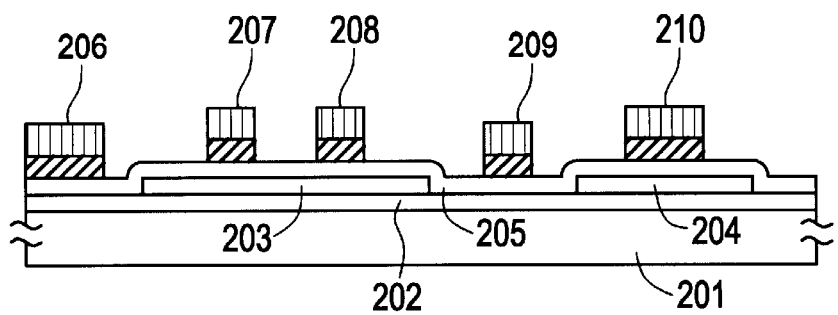
FIGS. 3(A)–3(F) and 4(A)–4(C) show manufacturing steps of thin-film transistors.
Figure 3B:
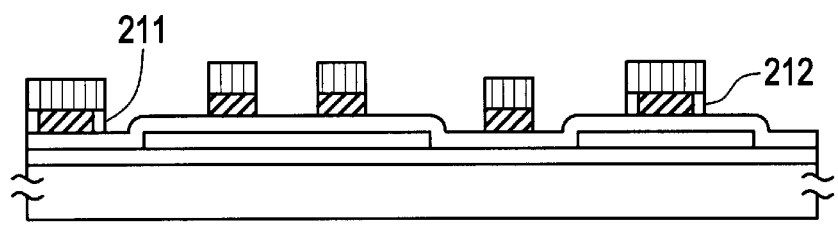
Figure 3C:
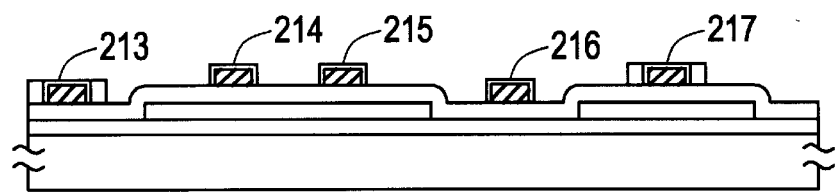

It should be noted that even though the barrier-type anodic oxide film was formed in the latter step, it was formed between the porous anodic oxide film and the gate electrode rather than outside the porous anodic oxide film (see FIG. 3(C)).

Then, impurity regions (source/drain regions) 218–220 were formed by implanting, by ion doping, impurities into the active layers 203 and 204 of the TFTs in a self-aligned manner using the gate electrode portions (i.e., the gate electrodes and the anodic oxide films surrounding those) as a mask. Phosphine ($PH_3$) and diborane ($B_2H_6$) were used as doping gases. The dose was $5 \times 10^{14}$ to $5 \times 10^{15}$ cm$^{-2}$ and the acceleration energy was 50–90 keV. Impurities were so introduced as to make the regions 218 and 220 of an N type and make the regions 219 of a P type. The regions 218 constitute an NTFT 228, the regions 219 constitute a PTFT 229, and the regions 220 constitute an NTFT 230.

Figure 3D:
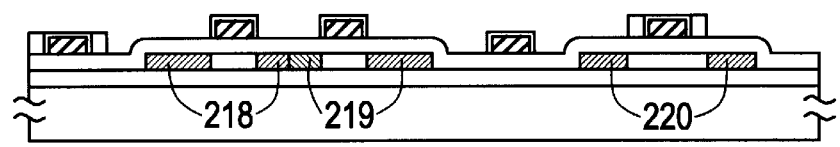
Figure 3E:
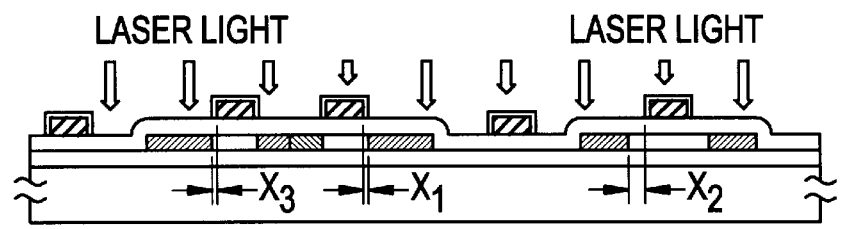
Figure 3F:
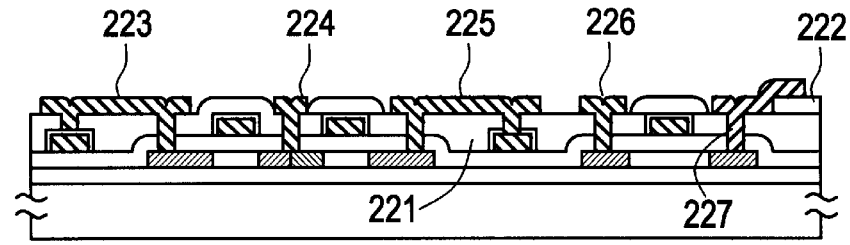

In the two TFTs (complementary TFTs) 228 and 229 located in the left-hand portion of FIG. 3(D), the thickness of the anodic oxide films 214 and 215 formed on the side faces of the gate electrodes were about 1,200 Å. Therefore, widths $x_1$ and $x_3$ of the regions (offset regions) each separating the gate electrode and the impurity region were about 1,000 Å (a broadening effect during ion doping is considered). On the other hand, since the total thickness of the anodic oxide films 212 and 217 in the right-hand TFT 230 was about 6,200 Å, an offset width $x_2$ was about 6,000 Å.

Then, the porous anodic oxide films 211 and 212 were etched with a mixed acid of phosphoric acid, acetic acid and nitric acid. In this etching step, only the anodic oxide films 211 and 212 were etched at a rate of about 600 Å/min, and the barrier-type anodic oxide films 213–217 and the silicon dioxide film 205 were left as they were. Subsequently, impurity ions introduced in the active layers were activated by illumination with KrF excimer laser light (wavelength: 248 nm; pulse width: 20 nsec) (see FIG. 3(E)).

Figure 4C:
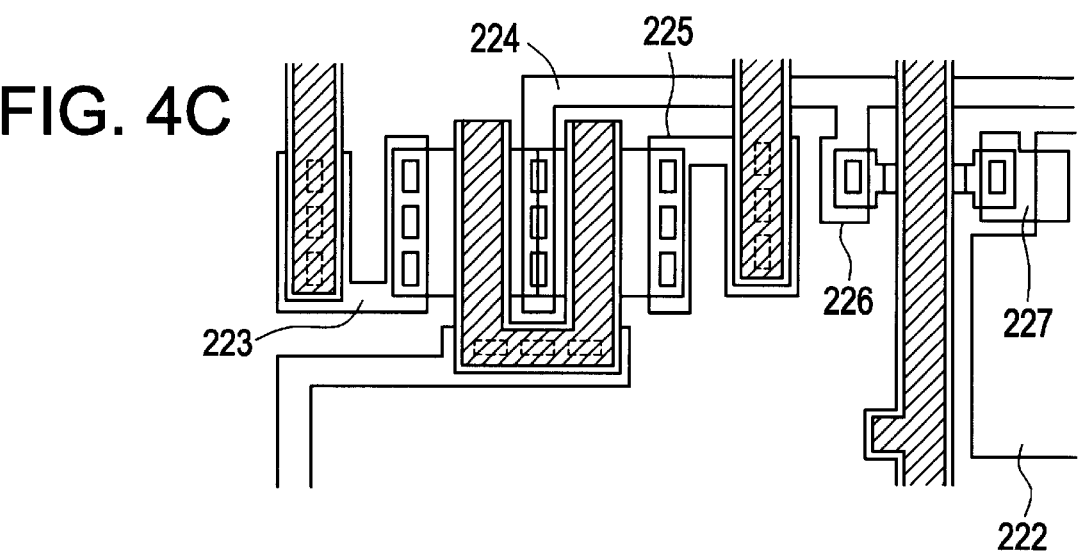

Then, the gate electrodes and the wiring lines were cut into necessary sizes and shapes (see FIG. 4(C)).

Thereafter, a 6,000-Å-thick silicon dioxide film as an interlayer insulating film 221 was formed over the entire surface by CVD. A pixel electrode 222 was formed by forming a 800-Å-thick ITO film by sputtering and then patterning it. Contact holes for the sources and drains of the TFTs were formed by etching the interlayer insulating film 221 and the gate insulating film 205 and, at the same time, contact holes for the gate electrodes and the wiring lines were formed by etching the interlayer insulating film 221 and the anodic oxide films 213–217. In this embodiment, since the anodic oxide films of groups A and B have approximately the same thickness, they can be etching at the same time. Finally, aluminum wiring lines and electrodes 223–226 were formed and hydrogen annealing was performed at 200–400° C.

Incidentally, the wiring line 223 is connected to the wiring line 206 and the source of the N-channel TFT of the complementary TFTs, and the wiring line 225 is connected to the source of the P-channel TFT of the complementary TFTs and the wiring line 209. The wiring line 224 (i.e., 226) is connected to the output terminal (i.e., the drains of the N-channel TFT and the P-channel TFT) of the complementary TFTs and the drain of the right-hand TFT. Further, the wiring line 227 is connected to the drain of the right-hand TFT and the pixel electrode 222. Thus, an integrated circuit having the TFTs was completed (see FIG. 3(F)).

As described in the embodiment, particularly in group A, since a driver is of a large current driving type, only a small deterioration occurs in a PTFT (the width of a high-resistivity region is denoted by $x_1$) and an NTFT (the width of a high-resistivity region is denoted by $x_4$). Since a decoder, CPU, shift register, memory and other driving circuits are of a small power consumption and high-frequency operation type, they are likely to be deteriorated by hot carriers because both of the channel width and the channel length are short. It is necessary that the width $x_3$ of a high-resistivity region of an NTFT used in those circuits be larger than the width $x_1$ of a high-resistivity region of a PTFT. An NTFT (the width of a high-resistivity region is denoted by $x_2$) of an active matrix circuit to which a high voltage is applied is very likely to be deteriorated, because only a small mobility is required. As a result, to improve the reliability, the following condition is required: $x_2 > x_3 > x_4 \geq x_1$. For example, $x_2$ is 0.5–1 μm, $x_3$ is 0.2–0.3 μm, $x_4$ is 0–0.2 μm, and $x_1$ is 0–0.1 μm. Under the above condition, it was possible to make the shift register operate in the frequency range of 1–50 MHz.

This embodiment can provide an eminent advantage of suppressing a leak current because of a large offset width of a TFT (right-hand TFT) for controlling the pixel electrode.

Then, referring to FIG. 6, a transparent electrode 302 of ITO was formed over the entire surface of an opposite substrate 301.

Orientation films 303 made of polyimide were then formed on the respective substrates 201 and 301. Subsequently, the orientation films 303 on the top and bottom substrates 201 and 301 were rubbed by an ordinary method in respective directions that are perpendicular to each other.

Then, silicon dioxide spacers (not shown) of 5 μm in diameter were dispersed over the substrate which had been coated with the orientation film 303. After a sealing agent (not shown) was printed on the substrate 201, the substrates 201 and 301 were opposed and bonded to each other. Thereafter, a liquid crystal material 304 was injected into the above cell by vacuum injection. A nematic liquid crystal ZLI-4792 (trade name) produced by Merck was used.

Thus, the liquid crystal electro-optical device 3 shown in FIG. 1 was produced. The number of pixels was 640×480. It may be 1,280×1,024.

A metal halide lamp was used as the light source 2. The output of the light source 2 was 250 W, and the temperature around the liquid crystal electro-optical device 3 was 50° C.

The size of the screen 5 was 800 mm×600 mm. The optical system 4 was composed of lenses, mirrors, etc.

Then, an ITO transparent electrode was formed by an ordinary process on the top surfaces of two polyethylene terephthalate substrates having approximately the same size as the screen 5 and being 0.5 mm in thickness. The two substrates thus prepared were opposed to each other, and the transparent electrode was patterned as shown in FIG. 5(C).

A protection film made of polyethylene terephthalate was formed on the electrode surface, to complete the position detecting means 6. The matrix size of the transparent electrodes was 640×480, which was the same as that of the liquid crystal display device 3.

Thus, the information input/output apparatus of FIG. 1 was completed.

An input pen is shown in the bottom portion of FIG. 5(C). The input pen is made of acrylic, glass, or the like, and a coil is wound around one of its tip portions.

An electric field is applied to the electrodes formed on the screen 5, and an electric field is also applied to the input pen. When the input pen is brought into contact with the screen 5 at an arbitrary position, an interaction between the magnetic field generated from the coil of the input pen and the electric field applied to the transparent electrodes on the screen 5 causes a difference between a current flowing through the portion in contact with the input pen and a current flowing through the other portions. Utilizing this phenomenon, the portion in contact with the pen is detected by current detecting circuits formed for the respective rows and columns. The current detecting circuits supply the driving circuit with a signal relating to the coordinates of the position of the screen 5 in contact with the pen. Based on the signal relating to the above coordinates, the driving circuit supplies display signals to the matrix of the liquid crystal electro-optical device 3 at the same coordinates as the above ones. As a result, an image is displayed at the position at which the input pen contacted with the screen 5.

To draw a character with the input pen, the driving on the liquid crystal electro-optical device 3 may be so performed as to cause the device 3 to hold a display content that is produced by moving the pen after contacting it to the screen 5.

A black matrix was formed on a front or a rear side of the screen 5, which enabled a display in which outlines of dots were prevented from blurring due to diffraction.

Embodiment 2

In Embodiment 2, an information input/output apparatus was produced in which the position detecting means 6 of the information input/output apparatus of Embodiment 1 was replaced by that using infrared sensors.

As shown in FIG. 5(D), infrared ray generating sources 501 and infrared sensors 502 were arranged on the horizontal and vertical peripheries of the screen 5. The infrared sensors 502, each of which has an opening that assumes a triangular shape having a base of 3 mm and a height of 5 mm, were formed at intervals of 1 cm on each of horizontal and vertical sides. The infrared ray generating sources 501 were provided on the other sides so as to correspond to the respective infrared sensors 502.

When a finger, a pen, or the like comes into contact with the screen 5 at an arbitrary position, infrared rays corresponding to coordinates of that position are blocked and do not reach the sensors 502. By arranging the infrared ray generating sources 501 and the infrared sensors 502 horizontally and vertically as in this embodiment, a position on which a finger or the like is placed was detected as horizontal and vertical coordinates. By supplying coordinate signals thus obtained to the driving circuit of the liquid crystal electro-optical device 3 and then supplying signals for changing a display state to the matrix of the liquid crystal electro-optical device 3 at the same coordinates, it can be indicated that information has been inputted to the screen 5.

Further, a black matrix was formed on the screen 5 so as to surround the respect pixels. This enabled a display in which the outlines of the respective pixels were prevented from blurring due to diffraction.

Embodiment 3

In Embodiment 3, an information input/output apparatus was produced in which the position detecting means 6 of the information input/output apparatus of Embodiment 1 was replaced by the touch panel shown in FIG. 5(A).

The touch panel was constructed as follows. A plurality of striped transparent electrode films made of ITO (indium tin oxide) were formed on a polyethylene terephthalate substrate that is elastic and has a size of 800 mm×600 mm. Rubber spacers of 40 μm in diameter were provided on this substrate at a pitch of 300 μm in each of the horizontal and vertical directions. Another polyethylene terephthalate substrate on which a plurality of striped transparent electrodes of ITO were formed was bonded to the above substrate so that the two groups of electrodes cross each other at right angles. When the touch panel thus constructed was pushed by a finger, a pen, or the like, an input signal was generated as a result of the top and bottom substrates contacting each other at a position of the matrix constituted of the striped electrodes which position corresponds to the pushed portion.

Since resulting coordinate signals from the touch panel were inputted to the driving circuit of the liquid crystal electro-optical device 3 or a computer circuit, a spot was displayed on the screen 5 at a position to which pressure was applied with a pen or the like. A line was drawn by moving the position to which pressure is applied. It became possible to display a button on the screen 5 and to effect a function of the button, for instance, erase all the display contents by applying pressure to the button.

Thus, a tablet was constructed on the screen 5.

Further, a black matrix was formed on the screen 5 so as to surround the respective pixels. This enabled a display in which the outlines of the respective pixels were prevented from blurring due to diffraction.

Embodiment 4

The information input/output apparatus of Embodiment 4 was modified as compared with the Embodiment 3 as follows. The liquid crystal electro-optical device 3 was composed of three shutter liquid crystal electro-optical devices using a ferroelectric liquid crystal and one active matrix type liquid crystal electro-optical device for image display also using a ferroelectric liquid crystal.

A description will be made of the liquid crystal material used in the shutter liquid crystal electro-optical device. The liquid crystal was a phenylpyrimidine-type ferroelectric liquid crystal whose phase series was Iso-SmA-SmC*. The phase transition temperatures of Iso-SmA and SmA-SmC* were 85° and 55° C., respectively. The magnitude of spontaneous polarization was 20 nC/cm$^2$.

A cell was formed by opposing, through spacers and a sealing material, transparent substrates over the entire surfaces of which transparent electrodes were formed. The above-described liquid crystal was injected into the cell at a temperature the liquid crystal was in the Iso phase. To obtain a better orientation state, the panel temperature was gradually decreased from this temperature to the room temperature at a rate of 5° C./hr. When the panel was driven by a rectangular wave of ±20 V and 5 Hz, it showed a contrast of 80 at the room temperature.

Three shutter liquid crystal electro-optical devices having the above configuration were prepared for red (R), green (G) and blue (B).

The liquid crystal electro-optical device for image display was an active drive type liquid crystal electro-optical device having the structure shown in FIG. 6. A liquid crystal cell was produced by two substrates that were subjected to reverse parallel rubbing. The space between the two substrates was maintained by spacers of 1.6 μm in diameter. The same ferroelectric liquid crystal material as used in the shutter liquid crystal electro-optical devices was injected into the space between the two substrates by the same process.

Figure 7:
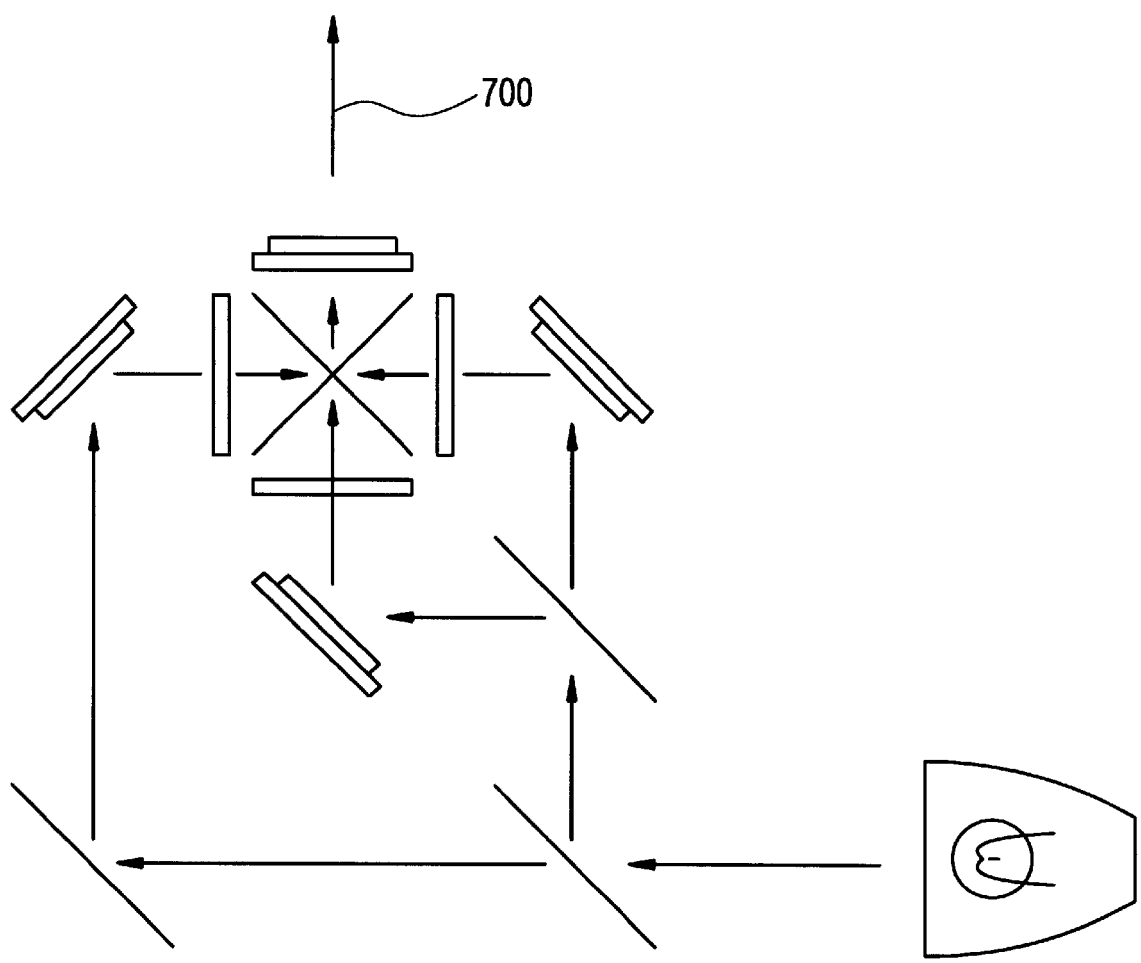
FIG. 7 shows a configuration of a liquid crystal electro-optical device unit of an embodiment of the invention.

FIG. 7 shows a liquid crystal electro-optical device unit of this embodiment. Light emitted from a light source is divided by half mirrors into three parts, which are inputted to shutters for displaying red, green and blue images. While the shutters are externally driven so as to produce desired display colors, light beams transmitted from the respective shutters are mixed by half mirrors and inputted to the panel for image display. Light 700 transmitted from the panel for image display is projected onto the screen 5 via the optical system 4 to perform color display on the screen 5.

The red shutter was made on during a first period, the green shutter was made on during a second period, and the blue shutter was made on during a third period, so that the color of the light supplied to the panel for image display was varied in time sequence in accordance with the three primary colors of light.

This enabled gradational display of 3 colors and 8 levels, i.e., 512 colors.

As in the case of Embodiment 3, the position detecting device 6 was used, which used the transparent electrodes that were arranged to assume a matrix.

Further, a black matrix was formed on the screen 5 so as to surround the respective pixels. This enabled a display in which the outlines of the respective pixels were prevented from blurring due to diffraction.

Embodiment 5

FIG. 2 shows an information input/output apparatus according to Embodiment 5.

In this embodiment, an image pickup device 8 for receiving light entering from the front side to the rear side of the screen 5 was provided within the main body 1, i.e., on the rear side of the screen 5. The screen size was 1,000 mm×750 mm.

A charge-coupled device (CCD), which is capable of color reading, was used as the image pickup device 8. An optical system (not shown) was provided separately from the optical system 4, to enable reception of incident light from the screen 5. The optical system 4 and a half mirror 7 may be used.

A filter for transmitting only the light that is brighter than a predetermined level may be used in the above optical system.

Circuit connection is so made that a signal carried by the incident light and read by the image pickup device 8 is inputted to a computer circuit (not shown). An output image from the computer circuit is displayed on the liquid crystal electro-optical device 3, and projected onto the screen 5 while being magnified by means of the light source 2 and the optical system 4.

When a light-emitting pen comes into contact with the screen 5, it is switched on to emit light of a particular color toward the rear side of the screen 5 (i.e., inside of the main body 1). In this embodiment, a pen was used which can emit light of one of three colors of red, green and blue toward the rear side of the screen 5.

When a particular point on the screen 5 (front side) was designated using a light-emitting pen that was so set as to emit red light, red light was emitted toward the rear side of the screen 5.

The emitted red light entered the image pick-up device 8 via the optical system. The image pickup device 8 detected a position on the screen 5 and the color of the emitted light, and resulting information signals were forwarded to a computer circuit or the driving circuit of the liquid crystal electro-optical device 3.

A spot of red that is the same as the color of the light emitted from the light-emitting pen was displayed on the screen 5. When the light-emitting pen was moved on the screen 5, a red line was displayed along a locus of the pen. Similarly, when the color of the light emitted from the light-emitting pen was made green, a green spot or line was displayed. When the color of the light emitted from the light-emitting pen was made blue, a blue spot or line was displayed. It goes without saying that there are employed a driving method and programming which equalizes the color of the incident light to the display color.

It is also possible to make a setting in which a single or a plurality of button-like regions in a part of the display surface are displayed and the display state is greatly changed when that region is designated by the light-emitting pen.

In addition to a display of a spot and a line, for example, the apparatus may be so adapted as to display a rectangle having a diagonal connecting two points on the screen 5 or paint over the rectangle with a particular color, when the two points are designated, Further, the apparatus may be so adapted that when a character is inputted, the input character is recognized and a properly shaped character is displayed which is stored in the computer circuit and corresponds to the input character.

In addition, the apparatus of this embodiment can be used for table computation, graphic image drawing, and other applications.

Further, in the information input/output apparatus of this embodiment, since the screen 5 is sufficiently large, many people, for instance, several tens to several hundred people were allowed to view characters or a figure drawn on the screen 5 using the light-emitting pen. That is, the apparatus was used like an electronic blackboard.

Further, a black matrix may be formed on the screen 5 so as to surround the respective pixels.

Embodiment 6

Embodiment 6 is directed to a configuration which, in the information input/output apparatus shown in FIG. 2, enables a document or object existing on the front side of the screen 5 to be read as image data by the image pickup device 8. The liquid crystal electro-optical device 3, the optical system 4 and the light source 2 were the same as those in Embodiment 1.

To read, as image data, a document or object existing on the front side of the screen 5, the screen 5 is required to be controlled, i.e., switched between the transparent state and the scattering state. The screen 5 suitable for that purpose can be constructed by a scattering mode ferroelectric liquid crystal electro-optical device or a polymer dispersion type liquid crystal electro-optical device.

The scattering mode ferroelectric liquid crystal electro-optical device does not use any polarizing plate and can increase the transmittance up to about 90%. Further, switching to the scattering state can be effected by voltage application. The polymer dispersion type liquid crystal electro-optical device has a transmittance of more than 80%, and can provide the similar advantages.

In this embodiment, the scattering mode ferroelectric liquid crystal electro-optical device was used as the screen 5.

A cell was formed by opposing, through spacers and a sealing material, two transparent substrates of 800 mm×600 mm over the entire inside surfaces of which substrates, transparent electrodes were formed. (The electrode surfaces were placed inside.) A ferroelectric liquid crystal was injected into the cell to complete the liquid crystal electro-optical device serving as the screen 5.

An information input/output apparatus was constructed using the screen 5 thus produced, and an image existing on the front side of the screen 5 was read.

To improve the quality of a readout image, a light for illuminating an object to be read such as a document was provided within the main body 1.

First, a document on which a drawing is written was attached to the front surface of the screen 5. When a DC voltage was applied between the electrodes of the two substrates of the liquid crystal electro-optical device that constituted the screen 5, the screen 5 became transparent with a transmittance of 90%.

The document was illuminated by means of the light. The light reflected from the document was read by the image pickup device 8, and resulting image data was stored into a storage device.

Subsequently, an AC voltage was applied to the liquid crystal electro-optical device that constituted the screen 5, to thereby render the screen 5 in the scattering state. The previously obtained image data being displayed on the liquid crystal electro-optical device 3 was displayed on the screen 5.

In the apparatus of this embodiment, the object to be read by the image pickup device 8 is not limited to a document on the screen 5. By properly modifying the optical system, it is possible to read an object existing on the front side of the screen 5, for instance, the face of a human watching an image being displayed on the screen 5 and, immediately thereafter, display it on the screen 5.

The position detecting means 6 may be provided on the screen 5. Further, a black matrix may be formed on the screen 5 so as to surround the respective pixels.

As described above in detail, according to the invention, it has become possible to provide an information input/output apparatus which allows an operator to input information of a position on the screen of a projection type liquid crystal electro-optical device by designating the position with a pen, a finger, or the like, and which can alter display contents of the liquid crystal electro-optical device accordingly.

According to the invention, it has become possible to provide an information input/output apparatus which can alter display contents of a display device that displays an image on a large-sized screen viewable by a number of persons in accordance with information directly inputted with respect to the display surface.

Further, an information input/output apparatus has been provided which can detect a position on the screen designated with a pen or the like and can display a corresponding image without causing any deterioration in the quality of an image projected onto the screen.

Further, it has become possible to read, as image data, a document or object existing on the front side of the screen.

As described above, the invention has made it possible for an operator to input information to the screen while feeling as if he were writing characters or a picture on a sheet.

What is claimed is:

1. A rear projection-type display device comprising:
a main body;
a light source provided in the main body;
at least one first liquid crystal electro-optical device provided in the main body and receiving light from said light source, said liquid crystal electro-optical device comprising a plurality of crystalline thin-film transistors that include switching thin-film transistors and driving peripheral circuit thin-film transistors formed over a substrate;
a screen comprising a second liquid crystal device wherein the screen receives light projected through the first liquid crystal electro-optical device; and
a black matrix provided over said screen.

2. A rear projection-type display device according to claim 1 wherein said driving peripheral circuit thin-film transistors are complementary types.

3. A rear projection-type display device according to claim 2 wherein said peripheral circuits comprise at least one of a decoder, CPU, shift register and memory.

4. A rear projection-type display device according to claim 1 wherein said at least one first liquid crystal electro-optical device comprises three liquid crystal electro-optical devices.

5. A rear projection-type display device according to claim 1 wherein a number of pixels of said at least one first liquid crystal electro-optical device is 640×480 or 1280×1024.

6. A rear projection-type display device according to claim 1 wherein said rear projection-type display device comprises dichroic mirrors.

7. A rear projection-type display device according to claim 4 wherein said rear projection-type display device comprises dichroic mirrors.

8. A rear projection-type display device according to claim 1 wherein said sensor comprises a CCD device.

9. A rear projection-type display device comprising:
a main body;
a light source provided in the main body;
at least one first liquid crystal electro-optical device provided in the main body and receiving light from said light source, said liquid crystal electro-optical device comprising a plurality of crystalline thin-film transistors that include switching thin-film transistors and driving peripheral circuit thin-film transistors formed over a substrate;
a sensor; and
a screen comprising a second liquid crystal device wherein the screen receives light projected through the first liquid crystal electro-optical device,
wherein said sensor senses light entered into an inside of the main body from an outside thereof through said screen.

10. A rear projection-type display device according to claim 9 wherein said driving peripheral circuit thin-film transistors are complementary types.

11. A rear projection-type display device according to claim 9 wherein said peripheral circuits comprise at least one of a decoder, CPU, shift register and memory.

12. A rear projection-type display device according to claim 9 wherein said at least one first liquid crystal electro-optical device comprises three liquid crystal electro-optical devices.

13. A rear projection-type display device according to claim 9 wherein a number of pixels of said at least one first liquid crystal electro-optical device is 640×480 or 1280×1024.

14. A rear projection-type display device according to claim 9 wherein said rear projection-type display device comprises dichroic mirrors.

15. A rear projection-type display device according to claim 12 wherein said rear projection-type display device comprises dichroic mirrors.

16. A rear projection-type display device according to claim 9 wherein said sensor comprises a CCD device.

17. A rear projection-type display device comprising:
a main body;
a light source provided in the main body;
at least one first liquid crystal electro-optical device provided in the main body and receiving light from said light source, said liquid crystal electro-optical device comprising a plurality of crystalline thin-film transistors that include switching thin-film transistors and driving peripheral circuit thin-film transistors formed over a substrate;
a screen comprising a second liquid crystal device wherein the screen receives light projected through the first liquid crystal electro-optical device; and
a black matrix provided over said screen,
wherein said second liquid crystal device is a light scattering liquid crystal device.

18. A rear projection-type display device according to claim 17 wherein said driving peripheral circuit thin-film transistors are complementary types.

19. A rear projection-type display device according to claim 17 wherein said peripheral circuits comprise at least one of a decoder, CPU, shift register and memory.

20. A rear projection-type display device according to claim 17 wherein said at least one first liquid crystal electro-optical device comprises three liquid crystal electro-optical devices.

21. A rear projection-type display device according to claim 17 wherein a number of pixels of said at least one first liquid crystal electro-optical device is 640×480 or 1280×1024.

22. A rear projection-type display device according to claim 17 wherein said rear projection-type display device comprises dichroic mirrors.

23. A rear projection-type display device according to claim 17 wherein said sensor comprises a CCD device.

24. A rear projection-type display device comprising:
a main body;
a light source provided in the main body;
at least one first liquid crystal electro-optical device provided in the main body and receiving light from said light source; and
a screen comprising a second liquid crystal device wherein the screen receives light projected by the first liquid crystal electro-optical device,
wherein said second liquid crystal device comprises a polymer dispersion type liquid crystal device.

25. A rear projection-type display device according to claim 24 wherein said driving peripheral circuit thin-film transistors are complementary types.

26. A rear projection-type display device according to claim 24 wherein said peripheral circuits comprise at least one of a decoder, CPU, shift register and memory.

27. A rear projection-type display device according to claim 24 wherein said at least one first liquid crystal electro-optical device comprises three liquid crystal electro-optical devices.

28. A rear projection-type display device according to claim 24 wherein a number of pixels of said at least one first liquid crystal electro-optical device is 640×480 or 1280×1024.

29. A rear projection-type display device according to claim 24 wherein said rear projection-type display device comprises dichroic mirrors.

30. A rear projection-type display device according to claim 24 wherein said sensor comprises a CCD device.

31. A rear projection-type display device comprising:
a main body;
a light source provided in the main body;
at least one first liquid crystal electro-optical device provided in the main body and receiving light from said light source; and
a screen comprising a second liquid crystal device wherein the screen receives light projected by the first liquid crystal electro-optical device.

32. A rear projection-type display device according to claim 31 wherein said second liquid crystal device is a light scattering liquid crystal device.

33. A rear projection-type display device according to claim 31 wherein said second light crystal device is a polymer dispersion type liquid crystal device.

34. A rear projection-type display device according to claim 31 wherein said at least one first liquid crystal electro-optical device comprises three liquid crystal electro-optical devices.

35. A rear projection-type display device according to claim 31 wherein a number of pixels of said at least one first liquid crystal electro-optical devices is 640×480 or 1280×1024.

36. A rear projection-type display device according to claim 31 wherein said rear projection-type display device comprises dichroic mirrors.

37. A rear projection-type display device according to claim 31 wherein said sensor comprises a CCD device.

38. A projection-type display device comprising:
a light source;
at least one first liquid crystal electro-optical device receiving light from said light source, said liquid crystal electro-optical device comprising a plurality of crystalline thin-film transistors that include switching thin-film transistors and driving peripheral circuit thin-film transistors formed over a substrate; and
a screen comprising a second liquid crystal device wherein the screen receives light projected through the first liquid crystal electro-optical device.

39. A projection-type display device according to claim 38 wherein said driving peripheral circuit comprises a shift register circuit operating in frequency range of more than 1 MHZ.

40. A projection-type display device according to claim 38 wherein said driving peripheral circuit thin-film transistors are complementary types.

41. A projection-type display device according to claim 38 wherein said peripheral circuits comprise at least one of a decoder, CPU, shift register and memory.

42. A projection-type display device according to claim 38 wherein said at least one first liquid crystal electro-optical device comprises three liquid crystal electro-optical devices.

43. A projection-type display device according to claim 38 wherein a number of pixels of said at least one first liquid crystal electro-optical device is 640×480 or 1280×1024.

44. A display device according to claim 38 wherein said rear projection-type display device comprises dichroic mirrors.

45. A projection-type display device according to claim 38 wherein said second liquid crystal device is a light scattering liquid crystal device.

46. A projection-type display device according to claim 38 wherein said second liquid crystal device is a polymer dispersion liquid crystal device.

47. A projection-type display device according to claim 38 wherein said sensor comprises a CCD device.

48. A rear projection-type display device comprising:
a main body;
a light source provided in the main body;
at least one first liquid crystal electro-optical device provided in the main body and receiving light from said light source, said liquid crystal electro-optical device comprising a plurality of crystalline thin-film transistors that include switching thin-film transistors and driving peripheral circuit thin-film transistors formed over a substrate, wherein said driving peripheral circuit comprises a shift register circuit operating in frequency range of more than 1 MHZ;
a screen comprising a second liquid crystal device wherein the screen receives light projected through the first liquid crystal electro-optical device; and
a sensor, wherein said sensor senses light entered into an inside of the main body from an outside thereof through said screen.

49. A rear projection-type display device according to claim 48 wherein said shift register circuit operates in frequency range of 1–50 MHz.

50. A rear projection-type display device according to claim 49 wherein said driving peripheral circuit thin-film transistors are complementary types.

51. A rear projection-type display device according to claim 50 wherein said peripheral circuits comprise at least one of a decoder, CPU, shift register and memory.

52. A rear projection-type display device according to claim 51 wherein said at least one first liquid crystal electro-optical device comprises three liquid crystal electro-optical devices.

53. A rear projection-type display device according to claim 52 wherein a number of pixels of said at least one first liquid crystal electro-optical device is 640×480 or 1280×1024.

54. A rear projection-type display device according to claim 53 wherein said rear projection-type display device comprises dichroic mirrors.

55. A rear projection-type display device according to claim 54 wherein said rear projection-type display device comprises dichroic mirrors.

56. A rear projection-type display device according to claim 50 wherein said second liquid crystal device is a light scattering liquid crystal device.

57. A rear projection-type display device according to claim 50 wherein said second liquid crystal device is a polymer dispersion type liquid crystal device.

58. A rear projection-type display device according to claim 48 wherein said sensor comprises a CCD device.

* * * * *